(12) United States Patent
Yi et al.

(10) Patent No.: US 10,938,517 B2
(45) Date of Patent: *Mar. 2, 2021

(54) METHOD FOR REPORTING A RADIO LINK CONTROL RE TRANSMISSION FAILURE AND A DEVICE THEREFOR

(71) Applicant: LG ELECTRONICS INC., Seoul (KR)

(72) Inventors: Seungjune Yi, Seoul (KR); Sunyoung Lee, Seoul (KR); Sungjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,037

(22) Filed: Jul. 3, 2019

(65) Prior Publication Data
US 2019/0327028 A1 Oct. 24, 2019

Related U.S. Application Data

(63) Continuation of application No. 15/855,989, filed on Dec. 27, 2017, now Pat. No. 10,476,636, which is a
(Continued)

(51) Int. Cl.
*H04L 1/08* (2006.01)
*H04L 1/18* (2006.01)
(Continued)

(52) U.S. Cl.
CPC ............ *H04L 1/08* (2013.01); *H04L 1/1809* (2013.01); *H04L 1/1864* (2013.01);
(Continued)

(58) Field of Classification Search
CPC . H04L 1/08; H04L 1/18; H04L 1/1809; H04L 1/1864; H04L 1/1896; H04L 43/06;
(Continued)

(56) References Cited

U.S. PATENT DOCUMENTS 7,852,803 B2 * 12/2010 Kim ..................... H04W 60/00
370/328
8,655,269 B2 2/2014 Suda
(Continued)

FOREIGN PATENT DOCUMENTS

CN 102870450 1/2013
JP 2008541544 11/2008
(Continued)

OTHER PUBLICATIONS

U.S. Appl. No. 14/897,592, Notice of Allowance dated Jun. 22, 2017, 9 pages.
(Continued)

*Primary Examiner* — Tri H Phan
(74) *Attorney, Agent, or Firm* — Lee Hong Degerman Kang Waimey

(57) ABSTRACT

The present invention relates to a wireless communication system. More specifically, the present invention relates to a method and a device for reporting an RLC (Radio Link Control) re-transmission failure in the wireless communication system, the method comprising: communicating with both the first BS and the second BS, wherein the first BS has a Radio Resource Control (RRC) connection with the UE; and reporting to the first BS, a Radio Link Control (RLC) retransmission error without RRC connection re-establishment for the first BS if the RLC retransmission error occurs in an RLC entity transmitting RLC PDU (Protocol Data Unit) to the second BS.

10 Claims, 14 Drawing Sheets

Related U.S. Application Data continuation of application No. 14/898,734, filed as application No. PCT/KR2014/006147 on Jul. 9, 2014, now Pat. No. 9,887,809.

(60) Provisional application No. 61/847,087, filed on Jul. 17, 2013.

(51) Int. Cl.

| H04W 24/10 | (2009.01) |
|---|---|
| H04W 72/04 | (2009.01) |
| H04W 76/15 | (2018.01) |
| H04W 76/28 | (2018.01) |
| H04W 76/34 | (2018.01) |
| H04L 1/00 | (2006.01) |

(52) U.S. Cl.
CPC .......... *H04L 1/1896* (2013.01); *H04W 24/10* (2013.01); *H04W 72/04* (2013.01); *H04W 76/15* (2018.02); *H04W 76/28* (2018.02); *H04W 76/34* (2018.02); *H04L 2001/0097* (2013.01)

(58) Field of Classification Search
CPC ......... H04L 43/062; H04L 2001/0097; H04W 24/10; H04W 28/02; H04W 28/04; H04W 40/125; H04W 72/04; H04W 76/025; H04W 76/04; H04W 76/048; H04W 76/064; H04W 76/15; H04W 76/18; H04W 76/19; H04W 76/28; H04W 76/34
See application file for complete search history.

(56) References Cited

U.S. PATENT DOCUMENTS

| 8,837,440 | B2 | 9/2014 | Feng et al. |
| 9,014,010 | B2 | 4/2015 | Yi et al. |
| 9,042,315 | B2* | 5/2015 | Lin ...................... H04W 76/18 370/329 |
| 9,344,234 | B2* | 5/2016 | Lin ......................... H04L 5/001 |
| 9,467,892 | B2 | 10/2016 | Quan et al. |
| 9,628,325 | B2 | 4/2017 | Terry |
| 9,699,822 | B2* | 7/2017 | Lee ....................... H04L 1/1858 |
| 9,706,418 | B2 | 7/2017 | Decarreau et al. |
| 9,763,283 | B2 | 9/2017 | Jung et al. |
| 9,838,158 | B2 | 12/2017 | Yi et al. |
| 9,860,797 | B2 | 1/2018 | Basu Mallick et al. |
| 9,887,809 | B2 | 2/2018 | Yi et al. |
| 10,277,453 | B2 | 4/2019 | Wu et al. |
| 10,476,636 | B2* | 11/2019 | Yi ........................... H04W 76/19 |
| 2005/0213533 | A1 | 9/2005 | Jin |
| 2008/0064390 | A1 | 3/2008 | Kim |
| 2008/0170522 | A1 | 7/2008 | Sammour et al. |
| 2009/0207739 | A1 | 8/2009 | Chun et al. |
| 2009/0285111 | A1 | 11/2009 | Ou |
| 2010/0296431 | A1 | 11/2010 | Terry et al. |
| 2011/0117905 | A1 | 5/2011 | Huang et al. |
| 2011/0154146 | A1 | 6/2011 | Shin et al. |
| 2011/0294508 | A1 | 12/2011 | Min et al. |
| 2012/0281548 | A1 | 11/2012 | Lin et al. |
| 2013/0003523 | A1 | 1/2013 | Singh et al. |
| 2014/0321267 | A1 | 10/2014 | Jiang et al. |
| 2015/0133122 | A1 | 5/2015 | Chen |
| 2015/0181479 | A1 | 6/2015 | Lin et al. |
| 2016/0142184 | A1 | 5/2016 | Yi et al. |
| 2016/0143003 | A1 | 5/2016 | Yi et al. |
| 2016/0183158 | A1 | 6/2016 | Decarreau et al. |
| 2018/0123739 | A1 | 5/2018 | Yi et al. |

FOREIGN PATENT DOCUMENTS

| KR | 10-2009-0083867 | 8/2009 | |
| KR | 10-2011-0130782 | 12/2011 | |
| KR | 1020120081736 | 7/2012 | |
| RU | 2392752 | 6/2010 | |
| WO | 2008097544 | 8/2008 | |
| WO | 2012/149898 | 11/2012 | |
| WO | 2012168332 | 12/2012 | |
| WO | WO-2014206489 A1 * | 12/2014 | ........ H04W 36/0069 |

OTHER PUBLICATIONS

Lte Advance, 3GPP; TSG-RAN; E-UTRA; RRC; Protocol specification (Release 11), 3GPP TS 36.331 v11.4.0 (Jun. 2013), Jul. 18, 2013, 7 pages.
Nokia et al., "Radio Link Monitoring of SCells," 3GPP TSG-RAN WG2 Meeting #72, R2-106183, Jacksonville, U.S.A., Nov. 15-19, 2010, 4 pages.
MediaTek Inc., "SCell radio link handling in Rel-11," 3GPP TSG-RAN WG2 Meeting #74, R2-113106, Barcelona, Spain, May 9-13, 2011, 3 pages.
PCT International Application No. PCT/KR2014/006147, Written Opinion of the International Searching Authority dated Oct. 30, 2014, 9 pages.
U.S. Appl. No. 15/855,989, Notice of Allowance dated Jun. 24, 2019, 15 pages.
U.S. Appl. No. 15/855,989, Office Action dated Apr. 3, 2019, 46 pages.
The State Intellectual Property Office of the People's Republic of China Application Serial No. 201480040395.6, Office Action dated Mar. 26, 2018, 18 pages.
Intel, "Radio link failure handling for dual connectivity", 3GPP TSG RAN WG2 Meeting #85bis, R2-141184, Apr. 2014, 3 pages.
European Patent Office Application Serial No. 14827028.3, Search Report dated Feb. 23, 2017, 10 pages.
Pantech, "Analysis of the RLF in dual connectivity", R2-131100, 3GPP TSG RAN WG2 Meeting #81bis, Apr. 2013, 5 pages.
CATT, "RLM considerations for dual connectivity", R2-131915, 3GPP TSG RAN WG2 Meeting #82, May 2013, 3 pages.
Intel Corporation, "Radio link failure handling for dual connectivity", R2-131990, 3GPP TSG RAN WG2 Meeting #82, May 2013, 4 pages.
State Intellectual Property Office of the People's Republic of China Application Serial No. 201480040395.6, Office Action dated Mar. 20, 2019, 15 pages.
3rd Generation Partnership Project (3GPP), "Technical Specification Group Radio Access Network; Evolved Universal Terrestrial Radio Access (E-UTRA); Study on Small Cell Enhancements for E-UTRA and E-UTRAN—Higher layer aspects (Release 12)," 3GPP TR 36.842 V0.2.0, May 2013, 38 pages.
U.S. Appl. No. 14/898,734, Notice of Allowance dated Sep. 27, 2017, 24 pages.
U.S. Appl. No. 14/898,734, Office Action dated May 25, 2017, 25 pages.
Russian Federation Federal Service for Intellectual Property, Patents and Trademarks Application Serial No. 2015154476/07, Office Action dated Apr. 10, 2017, 10 pages.
PCT International Application No. PCT/KR2014/006092, Written Opinion of the International Searching Authority dated Nov. 24, 2014, 10 pages.
Korean Intellectual Property Office Application No. 10-2015-7034761, Notice of Allowance dated Jul. 27, 2020, 2 pages.
CATT et al., "RLM considerations for dual connectivity", R2-130982, 3GPP TSG RAN WG2 Meeting #81bis, Apr. 2013, 3 pages.
European Patent Office Application Serial No. 14827028.3, Office Action dated Jan. 14, 2021, 7 pages.
NTT Docomo, Inc., "RAN2 status on Small Cell Enhancements", R3-131123, 3GPP TSG-RAN WG3 #80, May 2013, 8 pages.

* cited by examiner (a) Control-Plane Protocol Stack (b) User-Plane Protocol Stack Component carrier (a) C-Plane connectivity of eNBs involved in dual connectivity (b) U-Plane connectivity of eNBs involved in dual connectivity

METHOD FOR REPORTING A RADIO LINK CONTROL RE TRANSMISSION FAILURE AND A DEVICE THEREFOR

CROSS-REFERENCE TO RELATED APPLICATIONS

This application is a continuation of U.S. patent application Ser. No. 15/855,989, filed on Dec. 27, 2017, now U.S. Pat. No. 10,476,636, which is a continuation of U.S. patent application Ser. No. 14/898,734, filed on Dec. 15, 2015, now U.S. Pat. No. 9,887,809, which is the National Stage filing under 35 U.S.C. 371 of International Application No. PCT/KR2014/006147, filed on Jul. 9, 2014, which claims the benefit of U.S. Provisional Application No. 61/847,087, filed on Jul. 17, 2013, the contents of which are all hereby incorporated by reference herein in their entirety.

TECHNICAL FIELD

The present invention relates to a wireless communication system and, more particularly, to a method for reporting an RLC (Radio Link Control) re-transmission failure and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for reporting an RLC (Radio Link Control) re-transmission failure. The technical problems solved by the present invention are not limited to the above technical problems and those skilled in the art may understand other technical problems from the following description.

Technical Solution

The object of the present invention can be achieved by providing a method for operating by an apparatus in wireless communication system, the method comprising; communicating with both the first BS and the second BS, wherein the first BS has a Radio Resource Control (RRC) connection with the UE; and reporting to the first BS, a Radio Link Control (RLC) retransmission error without RRC connection re-establishment for the first BS if the RLC retransmission error occurs in an RLC entity transmitting RLC PDU (Protocol Data Unit) to the second BS.

In another aspect of the present invention provided herein is an apparatus in the wireless communication system, the apparatus comprising: an RF (radio frequency) module; and a processor configured to control the RF module, wherein the processor is configured to communicate with both the first BS and the second BS, wherein the first BS has a Radio Resource Control (RRC) connection with the UE; and to report, to the first BS, a Radio Link Control (RLC) retransmission error without RRC connection re-establishment for the first BS if the RLC retransmission error occurs in an RLC entity transmitting RLC PDU (Protocol Data Unit) to the second BS.

Preferably, the RLC retransmission error occurs is the RLC entity transmitting the RLC PDU to the second BS if a number of retransmission of RLC PDU reaches a predetermined maximum number in a radio bearer (RB) served by the second BS.

Preferably, the method further comprises: stopping at least one of transmission or reception of all RBs that have RLC connection with the second BS, if the RLC retransmission error occurs in the RLC entity transmitting RLC PDU to the second BS.

Preferably, the method further comprises: stopping at least one of transmission or reception of an RB comprising the RLC entity, if the RLC retransmission error occurs in the RLC entity transmitting RLC PDU to the second BS.

Preferably, said reporting comprises reporting a cause of the reporting indicating the RLC retransmission error if the RLC retransmission error occurs in an RLC entity transmitting RLC data PDU to the second BS.

Preferably, said reporting comprises reporting an identity of a RB comprising the RLC entity, if the RLC retransmission error occurs in the RLC entity transmitting RLC PDU to the second BS.

Preferably, the first BS and the second BS are connected via non-ideal backhaul.

It is to be understood that both the foregoing general description and the following detailed description of the present invention are exemplary and explanatory and are intended to provide further explanation of the invention as claimed.

Advantageous Effects

According to the present invention, the invention can provide a method for reporting an RLC re-transmission failure in a wireless communication system. Specifically, the invention can provide a solution about reporting an RLC re-transmission failure in a dual connectivity system.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
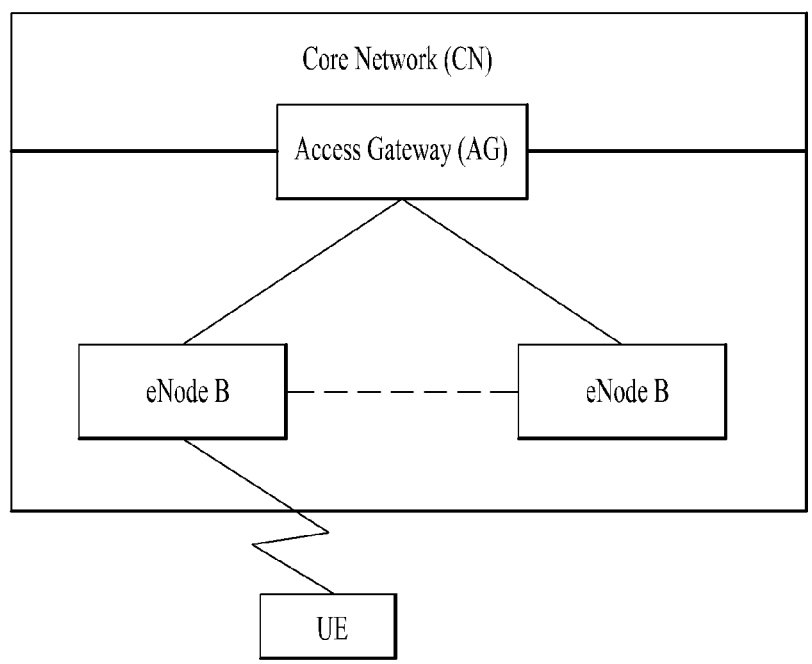
FIG. 1 is a diagram showing a network structure of an Evolved Universal Mobile Telecommunications System (E-UMTS) as an example of a wireless communication system.
Figure 2A:
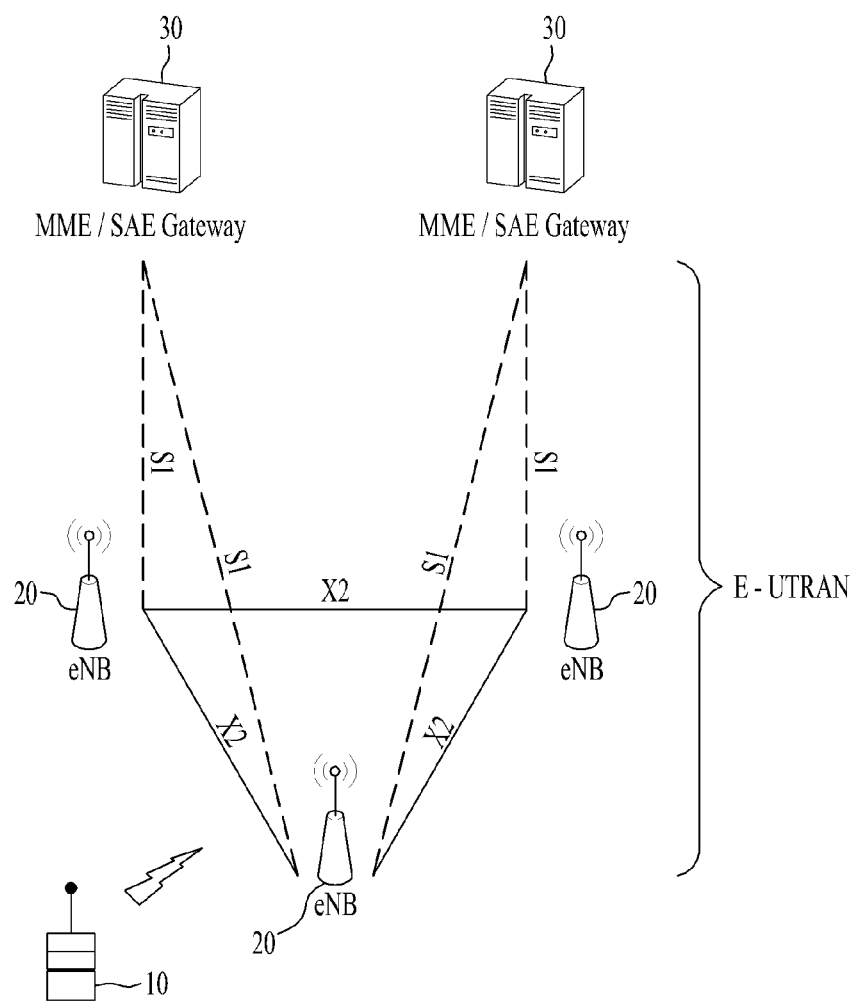
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
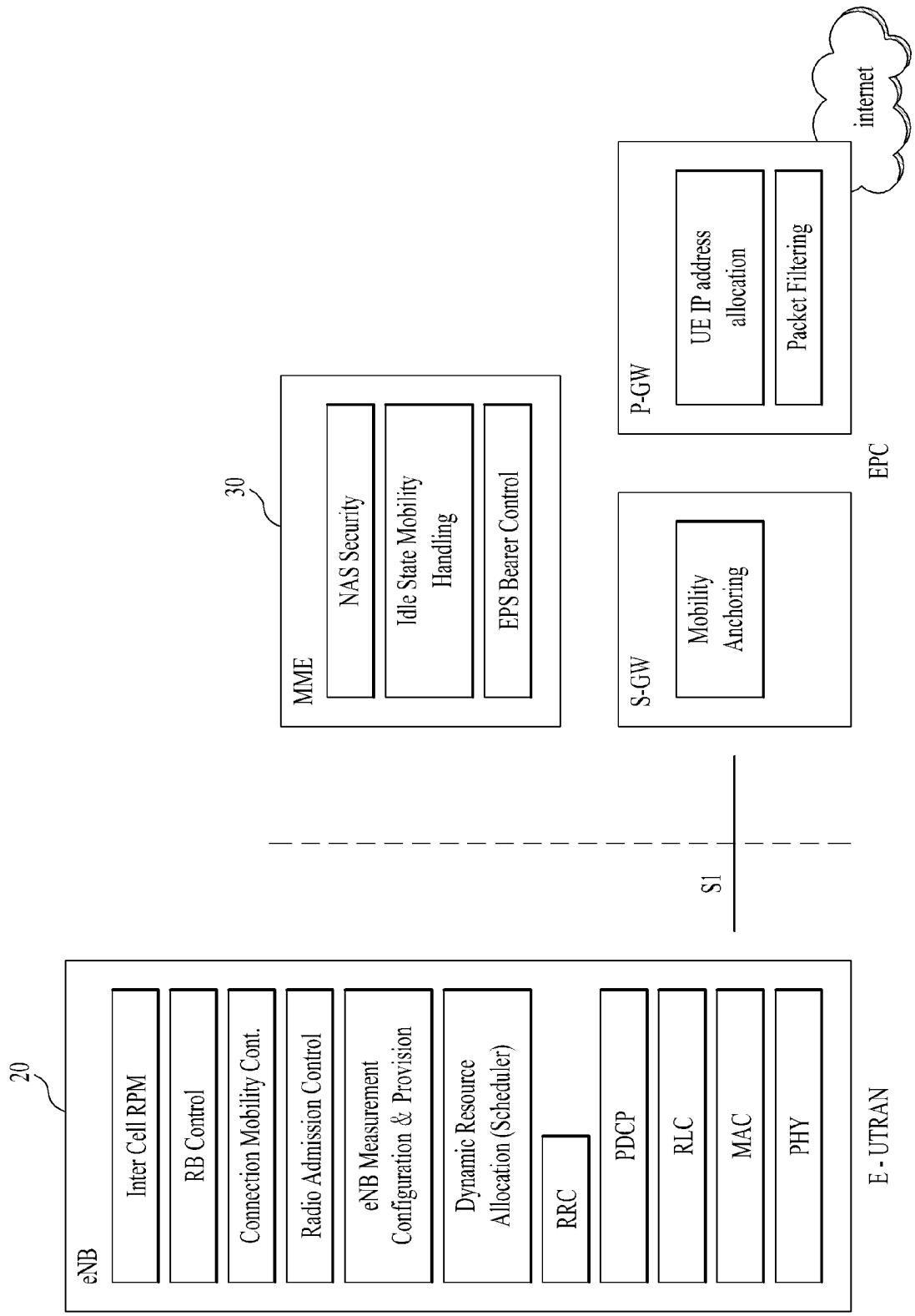
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
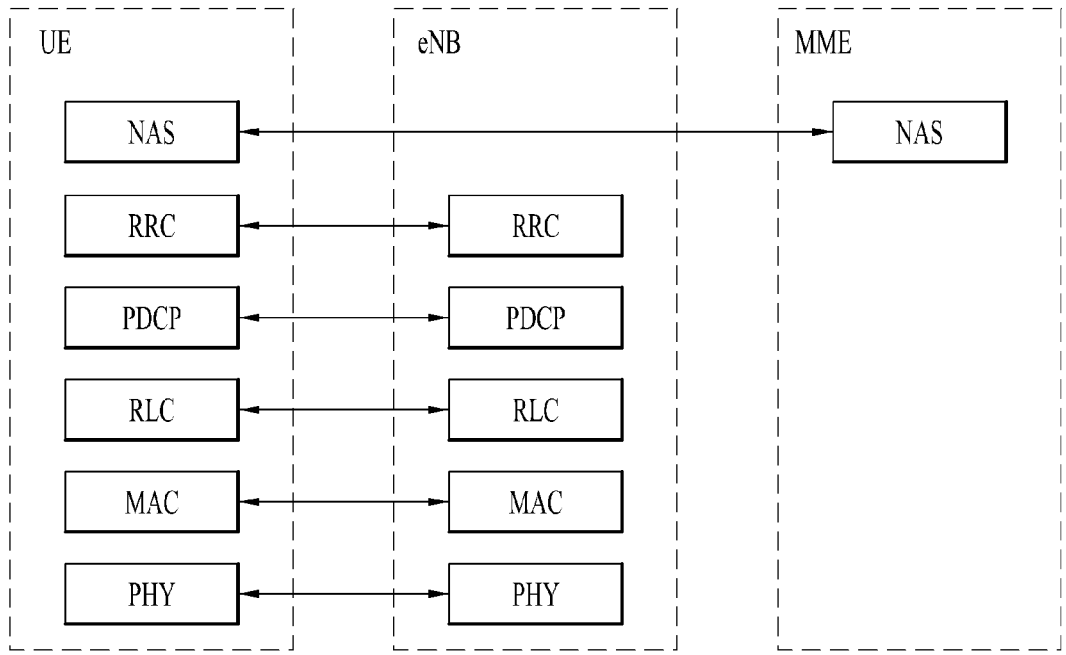
FIG. 3 is a diagram showing a control plane and a user plane of a radio interface protocol between a UE and an E-UTRAN based on a 3rd generation partnership project (3GPP) radio access network standard.
Figure 3:
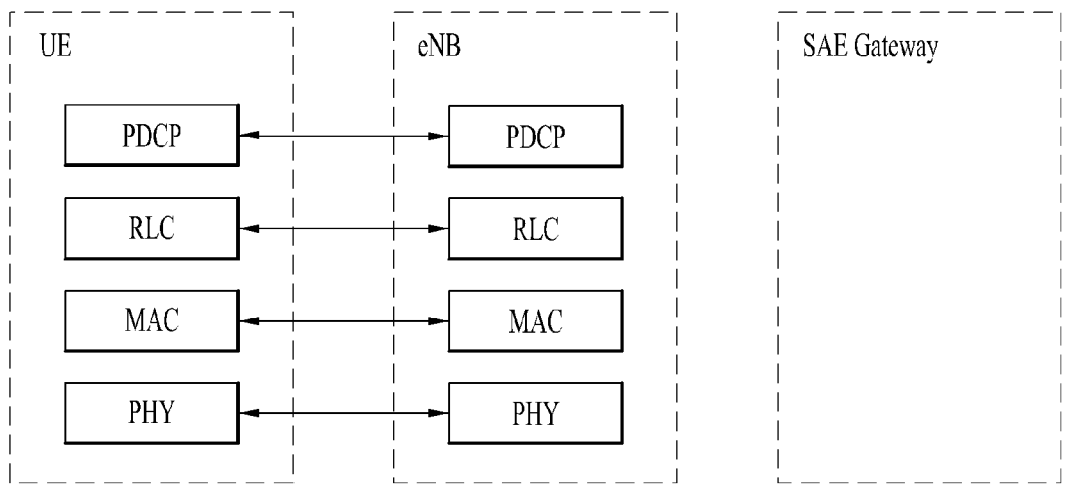

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
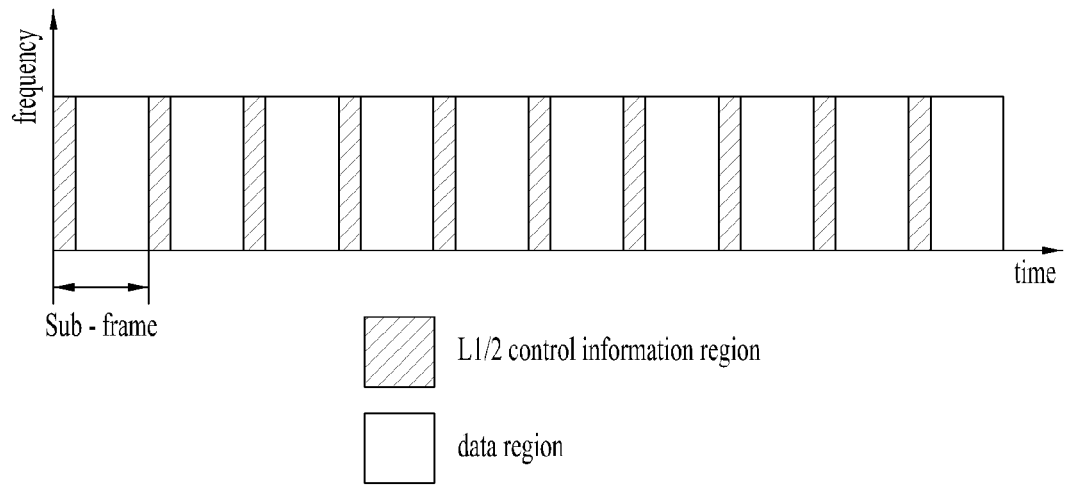
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
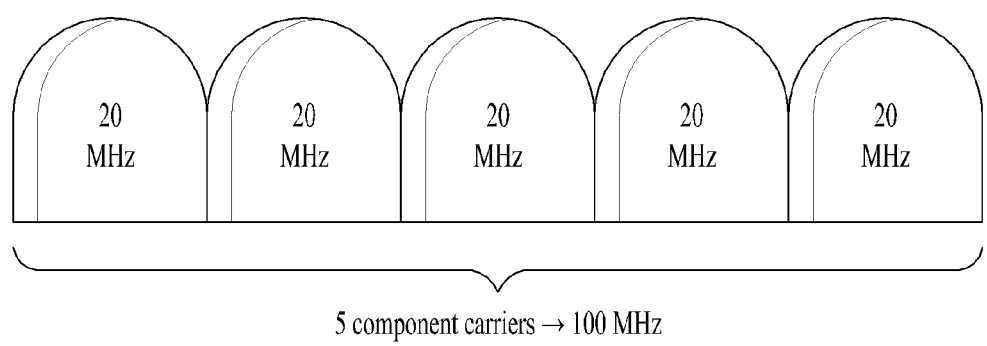
FIG. 5 is a diagram for carrier aggregation.

FIG. 5 is a diagram for carrier aggregation.

Carrier aggregation technology for supporting multiple carriers is described with reference to FIG. 5 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Figure 6:
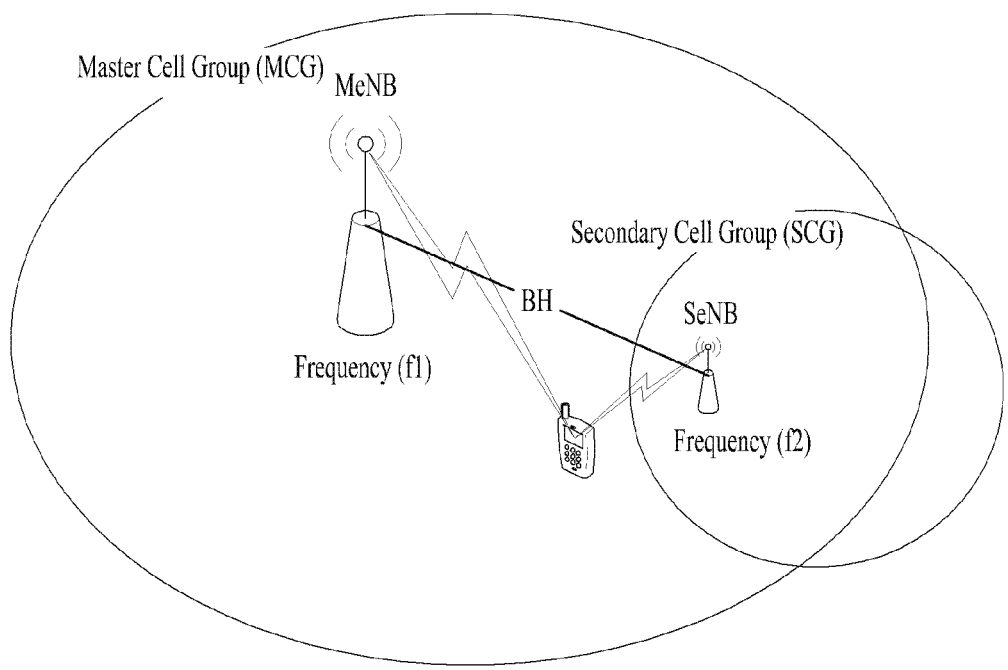
FIG. 6 is a conceptual diagram for dual connectivity between a Master Cell Group (MCS) and a Secondary Cell Group (SCG)

FIG. 6 is a conceptual diagram for dual connectivity (DC) between a Master Cell Group (MCS) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Figure 7A:
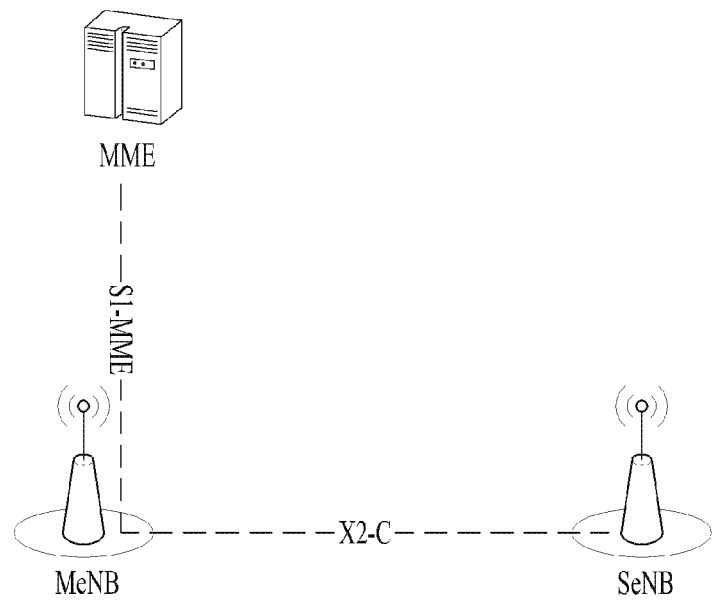
FIG. 7a is a conceptual diagram for C-Plane connectivity of base stations involved in dual connectivity.

FIG. 7a shows C-plane (Control Plane) connectivity of eNBs involved in dual connectivity for a certain UE: The MeNB is C-plane connected to the MME via S1-MME, the MeNB and the SeNB are interconnected via X2-C (X2-Control plane). As FIG. 7a, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

Figure 7B:
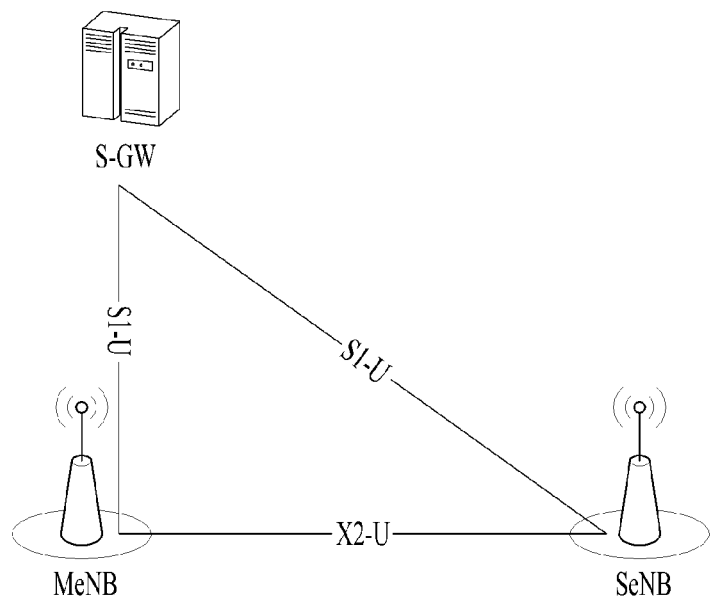
FIG. 7b is a conceptual diagram for U-Plane connectivity of base stations involved in dual connectivity.

FIG. 7b shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 8:
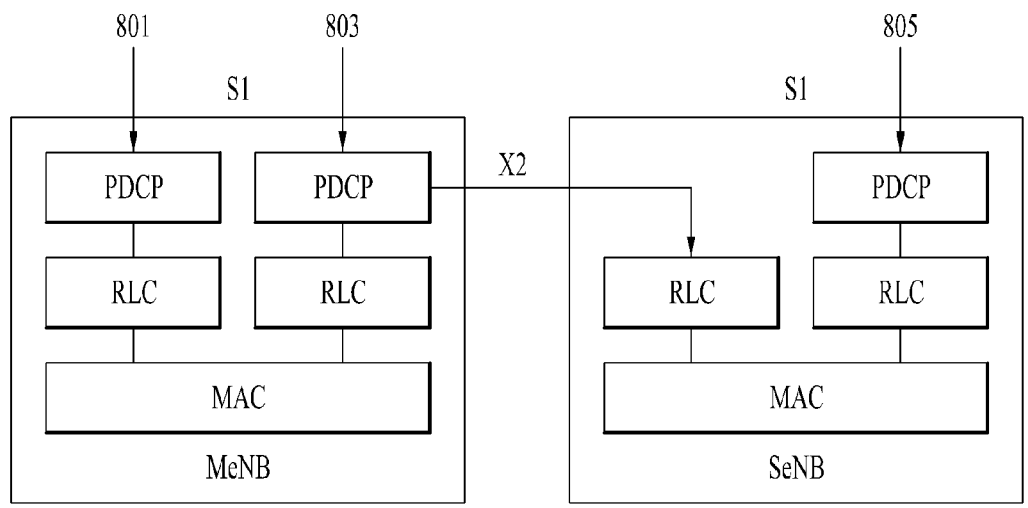
FIG. 8 is a conceptual diagram for radio protocol architecture for dual connectivity.

FIG. 8 is a conceptual diagram for radio protocol architecture for dual connectivity.

E-UTRAN of the present example can support dual connectivity operation whereby a multiple receptions/transmissions(RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (801), split bearer (803) and SCG bearer (805). Those three alternatives are depicted on FIG. 8. The SRBs (Signaling Radio Bearers) are always of the MCG bearer and therefore only use the radio resources provided by the MeNB. The MCG bearer (801) is a radio protocol only located in the MeNB to use MeNB resources only in the dual connectivity. And the SCG bearer (805) is a radio protocol only located in the SeNB to use SeNB resources in the dual connectivity.

Specially, the split bearer (803) is a radio protocol located in both the MeNB and the SeNB to use both MeNB and SeNB resources in the dual connectivity and the split bearer (803) may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

Figure 9:
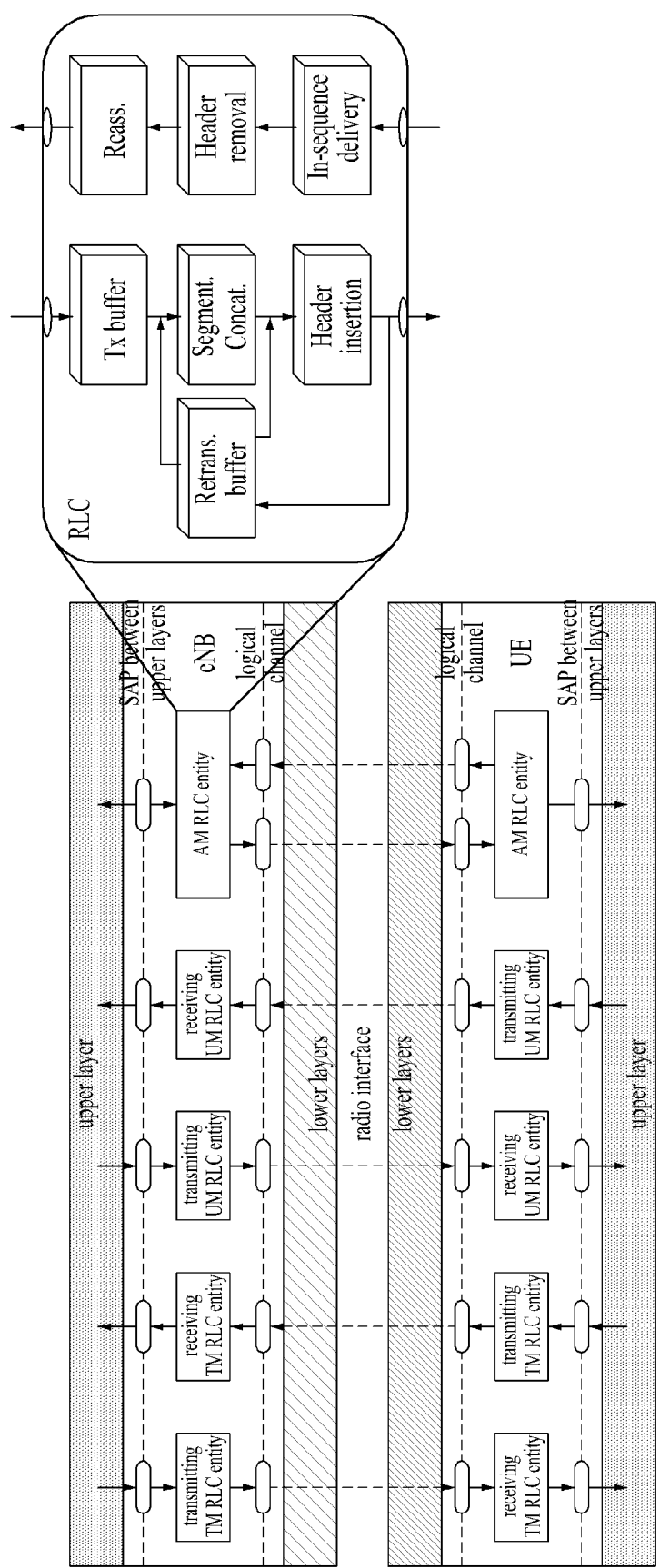
FIG. 9 is a conceptual diagram for an RLC entity architecture.

FIG. 9 is a conceptual diagram for an RLC entity architecture.

The RLC protocol takes data in the form of RLC SDUs from PDCP and delivers them to the corresponding RLC entity in the receiver by using functionality in MAC and physical layers. The relation between RLC and MAC, including multiplexing of multiple logical channels into a single transport channel, is illustrated in FIG. 9. Multiplexing of several logical channels into a single transport channel is mainly used for priority handling in conjunction with downlink and uplink scheduling.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

Segmentation, Concatenation, and Reassembly of RLC SDUs (Service Data Units)

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

RLC Retransmission

Retransmission of missing PDUs is one of the main functionalities of the RLC. Although most of the errors can be handled by the hybrid-ARQ protocol, there are benefits of having a second-level retransmission mechanism as a complement. By inspecting the sequence numbers of the received PDUs, missing PDUs can be detected and a retransmission requested from the transmitting side.

Different services have different requirements; for some services (for example, transfer of a large file), error-free delivery of data is important, whereas for other applications (for example, streaming services), a small amount of missing packets is not a problem. The RLC can therefore operate in three different modes, depending on the requirements from the application:

Transparent mode (TM), where the RLC is completely transparent and is essentially bypassed. No retransmissions, no segmentation/reassembly, and no in-sequence delivery take place. This configuration is used for control-plane broadcast channels such as BCCH (Broadcast Control Channel), CCCH (Common Control Channel), and PCCH (Paging Control Channel), where the information should reach multiple users. The size of these messages are selected such that all intended terminals are reached with a high probability and hence there is neither need for segmentation to handle varying channel conditions, nor retransmissions to provide error-free data transmission. Furthermore, retransmissions are not possible for these channels as there is no possibility for the terminal to feedback status reports as no uplink has been established.

Unacknowledged mode (UM) supports segmentation/reassembly and in-sequence delivery, but not retransmissions. This mode is used when error-free delivery is not required, for example voiceover IP, or when retransmissions cannot be requested, for example broadcast transmissions on MTCH (Multicast Traffic Channel) and MCCH (Multicast Control Channel) using MBSFN (Multicast/Broadcast over a Single Frequency Network).

Acknowledged mode (AM) is the main mode of operation for TCP/IP packet data transmission on the DL-SCH (Downlink-Shared Channel). Segmentation/reassembly, in-sequence delivery, and retransmissions of erroneous data are all supported.

Figure 10:
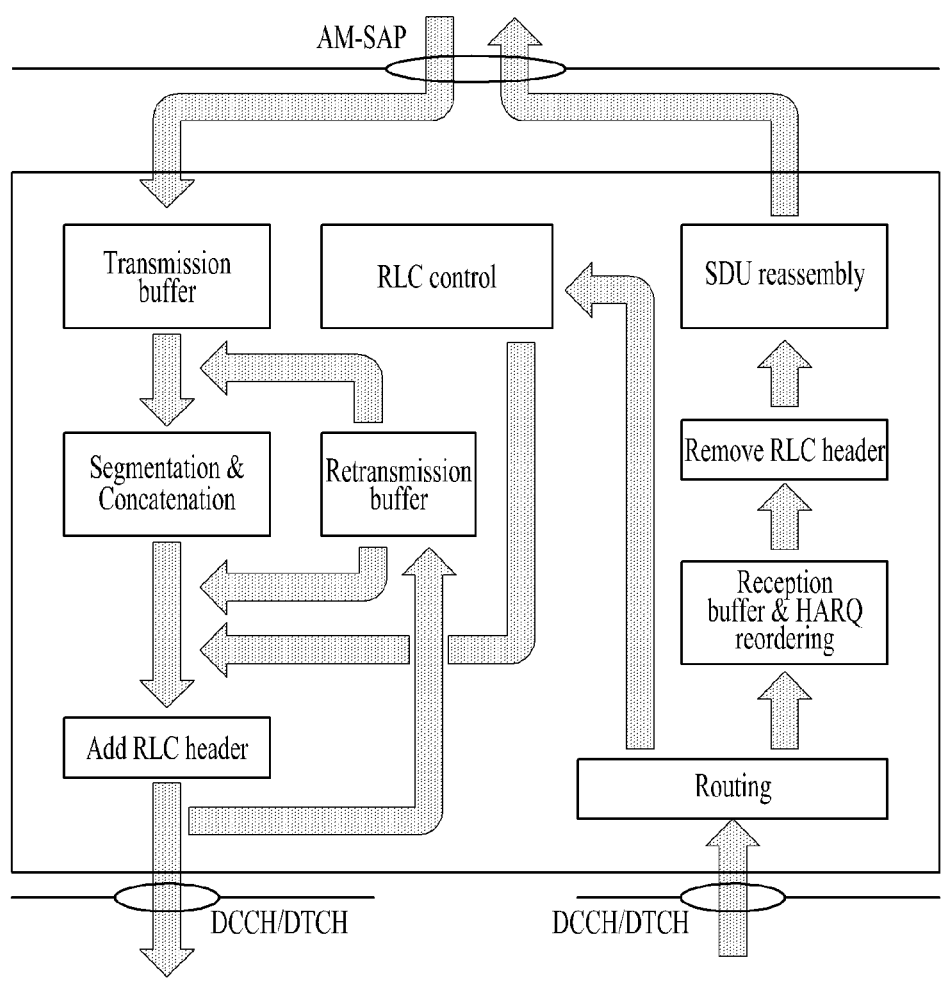
FIG. 10 is a conceptual diagram for an AM RLC (Acknowledged mode Radio Link Control) entity architecture.

FIG. 10 is a conceptual diagram for an AM RLC (Acknowledged mode Radio Link Control) entity architecture.

In acknowledged mode (AM), the RLC entity is bidirectional—that is, data may flow in both directions between the two peer entities. This is obviously needed as the reception of PDUs needs to be acknowledged back to the entity that transmitted those PDUs. Information about missing PDUs is provided by the receiving end to the transmitting end in the form of so-called status reports. Status reports can either be transmitted autonomously by the receiver or requested by the transmitter. To keep track of the PDUs in transit, the transmitter attaches an RLC header to each PDU, including, among other fields, a sequence number.

Both RLC entities maintain two windows, the transmission and reception windows respectively. Only PDUs in the transmission window are eligible for transmission; PDUs with sequence number below the start of the window have already been acknowledged by the receiving RLC. Similarly, the receiver only accepts PDUs with sequence numbers within the reception window. The receiver also discards any duplicate PDUs as each PDU should be assembled into an SDU only once.

Figure 11:
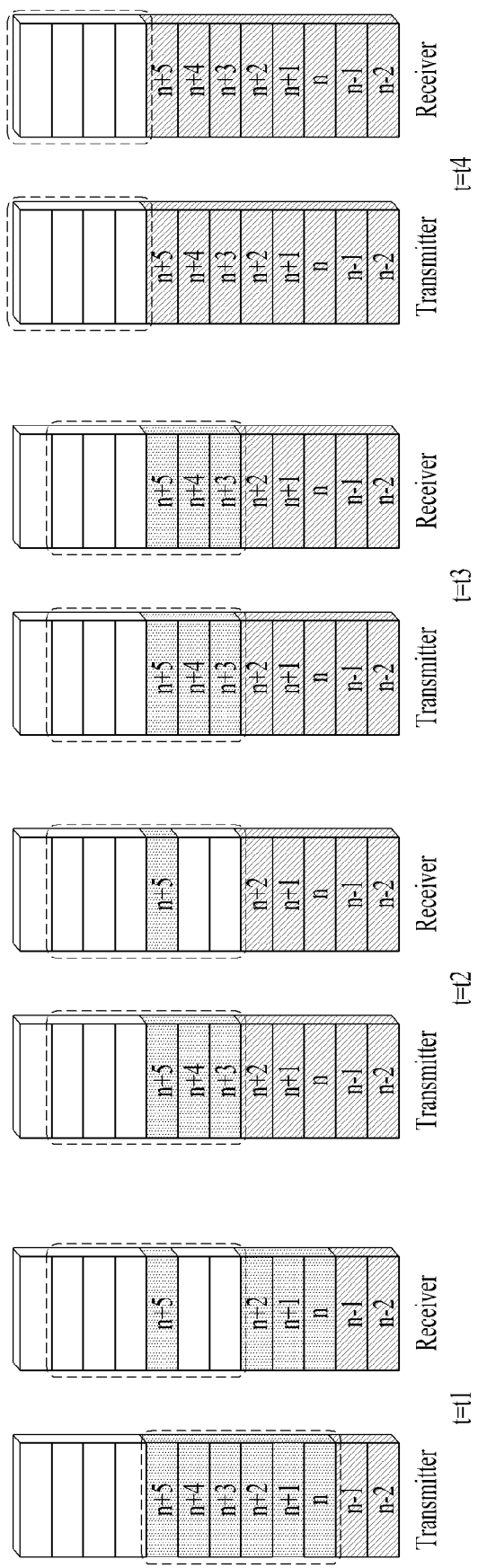
FIG. 11 is a conceptual diagram for performing re-transmission in an AM RLC entity.

FIG. 11 is a conceptual diagram for performing re-transmission in an AM RLC entity.

The RLC entity is responsible for regimentation of IP packets, also known as RLC SDUs, form the PDCP into smaller units, RLC PDUs. It also handles retransmission of erroneously received PDUs, as well as duplicate removal and concatenation of received PDUs. Finally, RLC ensures in-sequence delivery of RLC SDUs to upper layers.

The RLC retransmission mechanism is responsible for providing error-free delivery of data to higher layers. To accomplish this, a retransmission protocol operates between the AM RLC entities in the receiver and transmitter. By monitoring the incoming sequence numbers, the receiving RLC can identify missing PDUs.

When the AM RLC is configured to request retransmissions of missing PDUs as described above, it is said to be operating in Acknowledged Mode (AM). The AM RLC is typically used for TCP-based services such as file transfer where error-free data delivery is of primary interest.

1. Re-Transmission in AM RLC

The transmitting side of an AM RLC entity can receive a negative acknowledgement (notification of reception failure by its peer AM RLC entity) for an AMD PDU or a portion of an AMD PDU by a RLC status PDU from it peer AM RLC entity.

When receiving a negative acknowledgement for an AMD PDU or a portion of an AMD PDU by the RLC status PDU from its peer AM RLC entity, the transmitting side of the AM RLC entity may consider the AMD PDU or the portion of the AMD PDU for which a negative acknowledgement was received for retransmission if a Sequence Number (SN) of the corresponding AMD PDU falls within the range $VT(A) \leq SN < VT(S)$.

Herein, the 'VT(A)' indicates an acknowledgement state variable, this state variable holds the value of the SN of the next AMD PDU for which a positive acknowledgment is to be received in-sequence, and it serves as the lower edge of the transmitting window. It is initially set to 0, and is updated whenever the AM RLC entity receives a positive acknowledgment for an AMD PDU with SN=VT(A). And the 'VT(S)' indicates a send state variable, this state variable holds the value of the SN to be assigned for the next newly generated AMD PDU. It is initially set to 0, and is updated whenever the AM RLC entity delivers an AMD PDU with SN=VT(S).

When an AMD PDU or a portion of an AMD PDU is considered for retransmission, the transmitting side of the AM RLC entity may set the RETX_COUNT associated with the AMD PDU to zero if the AMD PDU is considered for retransmission for the first time. And the transmitting side of the AM RLC entity may increment the RETX_COUNT if it (the AMD PDU or the portion of the AMD PDU that is considered for retransmission) is not pending for retransmission already, or a portion of it is not pending for retransmission already. And the transmitting side of the AM RLC entity may indicate to upper layers that max retransmission has been reached if RETX_COUNT=maxRetxThreshold.

Herein, the 'RETX_COUNT' is a counter counting the number of retransmissions of an AMD PDU. There is one RETX_COUNT counter per PDU that needs to be retransmitted. And the 'maxRetxThreshold' is configured maximum number of re-transmission.

When retransmitting an AMD PDU, the transmitting side of an AM RLC entity may segment the AMD PDU, form a new AMD PDU segment which will fit within the total size of RLC PDU(s) indicated by lower layer at the particular transmission opportunity and deliver the new AMD PDU segment to lower layer if the AMD PDU doesn't entirely fit within the total size of RLC PDU(s) indicated by lower layer at the particular transmission opportunity.

When retransmitting a portion of an AMD PDU, the transmitting side of an AM RLC entity may segment the portion of the AMD PDU as necessary, form a new AMD PDU segment which will fit within the total size of RLC PDU(s) indicated by lower layer at the particular transmission opportunity and deliver the new AMD PDU segment to lower layer.

2. Re-Transmission Failure in AM RLC

The 'retransmission failure' means a detection of radio link failure. The UE can determine when the radio link failure occurs by following:

Upon a timer T310 expiry. The timer T310 starts upon detecting physical layer problems (i.e. upon receiving N310 (N310=Maximum number of consecutive "out-of-sync" indications received from lower layers) consecutive out-of-sync indications from lower layers) and stops upon receiving N311 (N311=Maximum number of consecutive "in-sync" indications received from lower layers) consecutive in-sync indications from lower layers, upon triggering the handover procedure and upon initiating the connection re-establishment procedure. The timer T310 expires if security is not activated, UE goes to RRC_IDLE else and initiates the connection re-establishment procedure.

Upon random access problem indication from MAC while neither a timer T300, T301, T304 nor T311 is running. The timer T300 starts transmission of RRCConnectionRequest and stops reception of RRCConnectionSetup or RRCConnectionReject message, cell re-selection and upon abortion of connection establishment by upper layers. The timer T301 starts when RRCConnectionReestablishmentRequest is transmitted and stops when RRCConnectionReestablishment or RRCConnectionReestablishmentReject message is received as well as when the selected cell becomes unsuitable. The timer T304 starts when RRCConnectionReconfiguration message including the MobilityControlInfo is received or MobilityFromEUTRACommand message including CellChangeOrder is received and stops when a criterion for successful completion of handover to EUTRA or cell change order is met (the criterion is specified in the target RAT in case of inter-RAT). Finally, the timer T311 starts upon initiating the RRC connection re-establishment procedure and stops when selection of a suitable E-UTRA cell or a cell using another RAT is performed.

Upon indication from RLC that the maximum number of retransmissions has been reached.

RLC status PDUs are reported as feeding back to the transmitting RLC, requesting retransmission of missing PDUs. When to feedback a status report is configurable, but a report typically contains information about multiple PDUs and is transmitted relatively infrequently. Based on the received status report, the RLC entity at the transmitter can take the appropriate action and retransmit the missing PDUs if requested.

Regarding FIG. 11, at time t=t1, PDUs up to n+5 have been transmitted. Only PDU n+5 has arrived and PDUs n+3 and n+4 are missing. This can cause a reordering timer to start. However, in this example no PDUs arrive prior to the expiration of the timer. The expiration of the timer, at time t=t2, triggers the receiver to send a control PDU containing a status report, indicating the missing PDUs, to its peer entity. Control PDUs have higher priority than data PDUs to avoid the status reports being unnecessarily delayed and negatively impact the retransmission delay. Upon reception of the status report at time t=t3, the transmitter knows that PDUs up to n+2 have been received correctly and the transmission window is advanced. The missing PDUs n+3 and n+4 are retransmitted and, this time, correctly received. The retransmission was triggered by the reception of a status report in this example. However, as the hybrid-ARQ and RLC protocols are located in the same node, tight interaction between the two is possible. The hybrid-ARQ protocol at the transmitting end could therefore inform the RLC at the transmitting end in case the transport block(s) containing PDUs n+3 and n+4 have failed. The RLC can use this to trigger retransmission of missing PDUs without waiting for an explicit RLC status report, thereby reducing the delays associated with RLC retransmissions.

Finally, at time t=t4, all PDUs, including the retransmissions, have been delivered by the transmitter and successfully received. As n+5 was the last PDU in the transmission buffer, the transmitter requests a status report from the receiver by setting a flag in the header of the last RLC data PDU. Upon reception of the PDU with the flag set, the receiver will respond by transmitting the requested status report, acknowledging all PDUs up to and including n+5. Reception of the status report by the transmitter causes all the PDUs to be declared as correctly received and the transmission window is advanced.

Status reports can, as mentioned earlier, be triggered for multiple reasons. However, to control the amount of status reports and to avoid flooding the return link with an excessive number of status reports, it is possible to use a status prohibit timer. With such a timer, status reports cannot be transmitted more often than once per time interval as determined by the timer.

For the initial transmission, it is relatively straightforward to rely on a dynamic PDU size as a means to handle the varying data rates. However, the channel conditions and the amount of resources may also change between RLC retransmissions. To handle these variations, already transmitted PDUs can be (re)segmented for retransmissions. The reordering and retransmission mechanisms described above still apply; a PDU is assumed to be received when all the segments have been received. Status reports and retransmissions operate on individual segments; only the missing segment of a PDU needs to be retransmitted.

Figure 12:
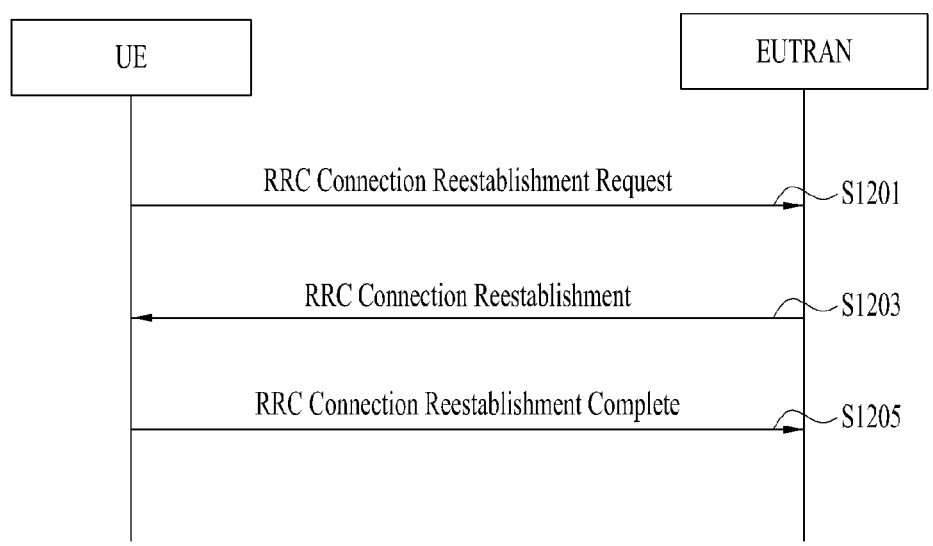
FIG. 12 is a conceptual diagram for performing RRC connection re-establishment.

FIG. 12 is a conceptual diagram for performing RRC connection re-establishment.

The purpose of this procedure is to re-establish the RRC connection, which involves the resumption of SRB1 (Signaling Radio Bearer 1) operation, the re-activation of security and the configuration of only the PCell.

A UE in RRC_CONNECTED, for which security has been activated, may initiate the procedure in order to continue the RRC connection. The connection re-establishment succeeds only if the concerned cell is prepared i.e. has a valid UE context. In case E-UTRAN accepts the re-establishment, SRB1 operation resumes while the operation of other radio bearers remains suspended. If AS (Access Stratum) security has not been activated, the UE does not initiate the procedure but instead moves to RRC_IDLE directly.

The UE shall only initiate the procedure when AS security has been activated (S1201). The UE initiates the procedure when one of the following conditions is met:

Upon detecting radio link failure;
Upon handover failure;
Upon mobility from E-UTRA failure;
Upon integrity check failure indication from lower layers; and
Upon an RRC connection reconfiguration failure.

When the EUTRAN receives RRCConnectionReestablishmentRequest message from the UE (S1201), the EUTRAN transmits RRCConnectionReestablishment command to the UE (S1203). And the UE can transmit RRCConnectionReestablishmentComplete message to the EUTRAN in order to inform of completing of the RRC connection re-establishment (S1205).

Figure 13:
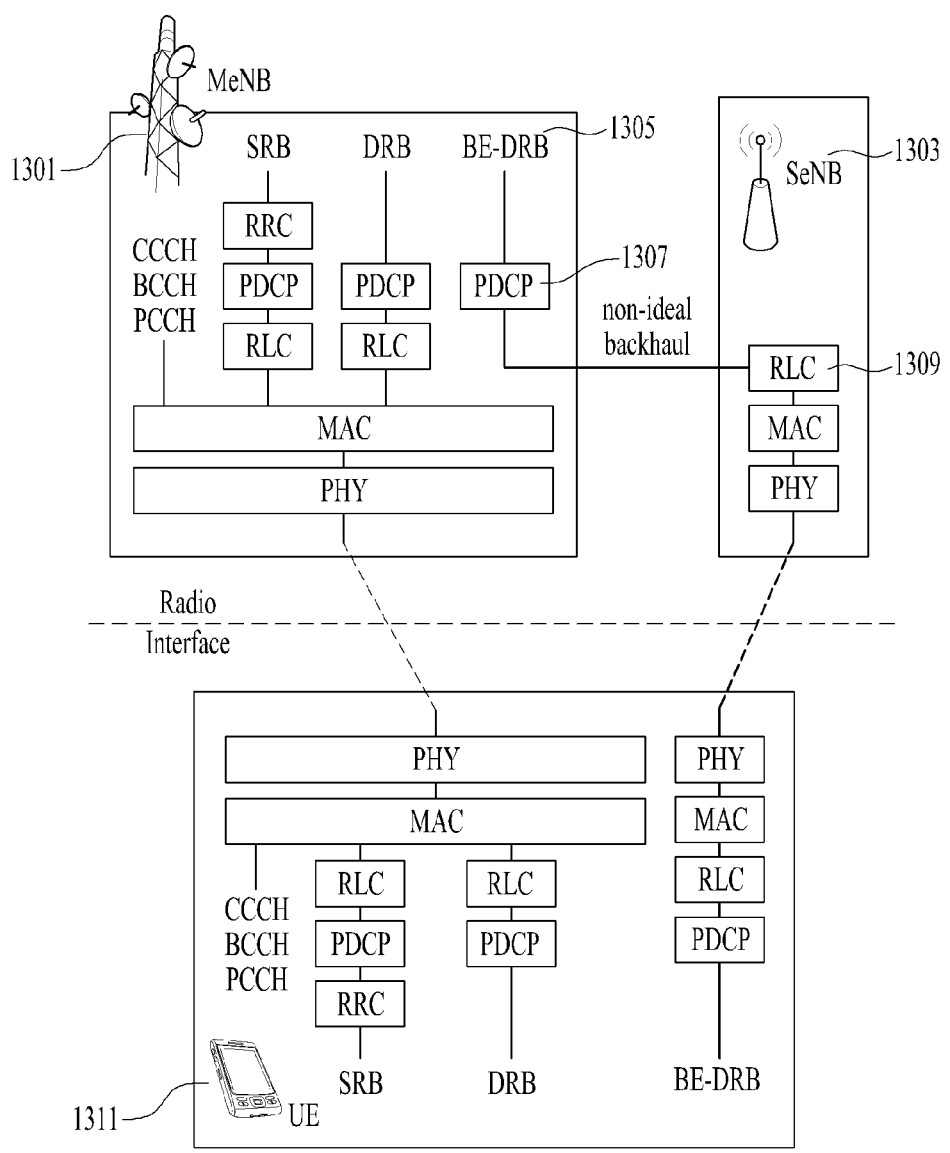
FIG. 13 is a conceptual diagram for one of radio protocol architecture for dual connectivity.

FIG. 13 is a conceptual diagram for one of radio protocol architecture for dual connectivity.

In the prior art, if RLC retransmission error occurs, i.e. if the number of retransmission of a RLC Data PDU comprising an AMD PDU or a portion of an AMD PDU reaches configured maximum number (maxRetxThreshold), the RLC indicates to RRC that maximum retransmission has been reached. Then, the RRC considers that radio link failure (RLF) is detected, and initiates RRC Connection re-establishment procedure to reset the whole RRC connection.

In LTE Rel-12, a new study on dual connectivity, i.e. UE is connected to both MeNB (1301) and SeNB (1303), as shown in FIG. 13. In this figure, the interface between MeNB (1301) and SeNB (1303) is called Xn interface. The Xn interface is assumed to be non-ideal; i.e. the delay in Xn interface could be up to 60 ms, but it is not limited thereto.

By the way, the SeNB (1303) is responsible for transmitting best effort (BE) type traffic, while the MeNB (1301) is responsible for transmitting other types of traffic such as VoIP, streaming data, or signaling data. To support dual connectivity, various protocol architectures are studied, and one of potential architectures (1305) is shown in FIG. 13. In this architecture (1305), PDCP and RLC entities are located in different network nodes, i.e. the PDCP entity (1307) in MeNB (1301) and RLC entity (1309) in SeNB (1303). In the UE side (1311), the protocol architecture is same as prior art except that the MAC entity is setup for each eNB (i.e. MeNB and SeNB).

The problem is that applying prior art of handling RLC retransmission error to protocol architecture supporting dual connectivity is quite inefficient considering that connection with SeNB is just for data transmission. That is, if RLC retransmission error occurs in RLC for SeNB, it would be sufficient for the UE to recover the RB using the RLC or RBs serviced by the SeNB, without re-establishing the RRC connection to MeNB.

Moreover in the prior art when RLC retransmission error occurs, the RLC does nothing except for indicating RLC retransmission error to RRC. It means that even if RLC retransmission error occurs, the RLC keeps retransmitting RLC Data PDUs until RRC connection is re-established. If RLC retransmission error occurs in the RLC for SeNB, recovering RLC connection with SeNB will take longer time considering 60 ms latency in non-ideal backhaul, and thus keeping retransmission of RLC Data PDUs through erroneous link would waste much radio resource in the SeNB.

Figure 14:
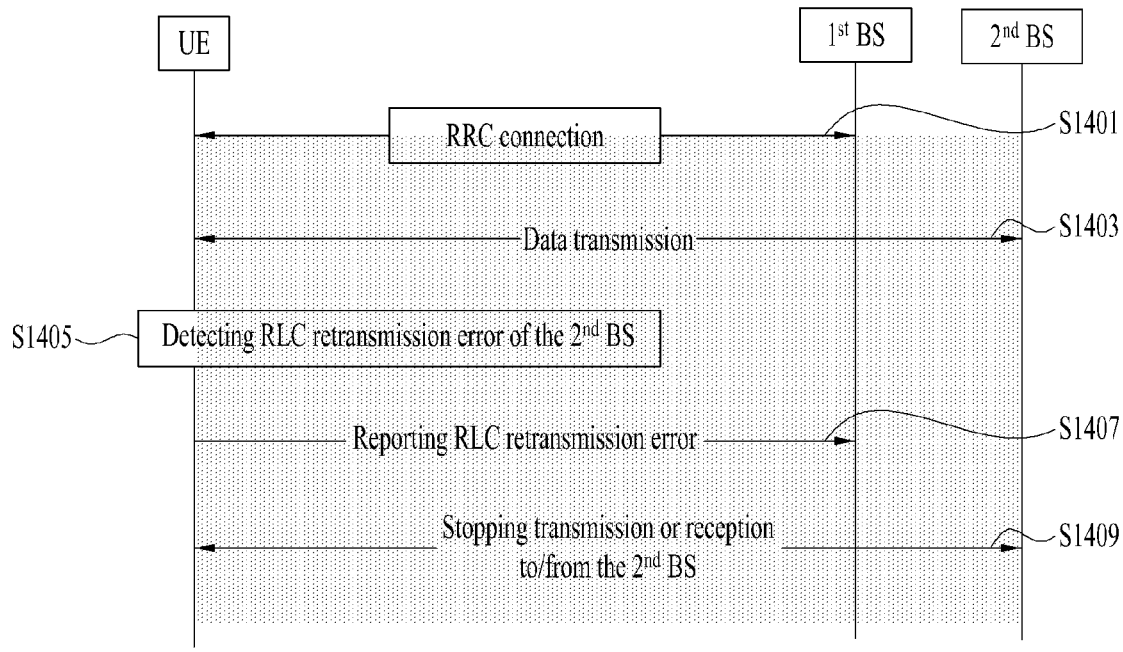
FIGS. 14 to 16 are conceptual diagrams for reporting RLC re-transmission failure according to embodiments of the present invention.

FIG. 14 is a conceptual diagram for reporting a Radio Link Control (RLC) retransmission error according to embodiments of the present invention.

To overcome the above-mentioned problem, it is invented that when a RLC retransmission error occurs in a radio bearer served by a $2^{nd}$ base station (BS), the RLC can stop transmitting any further RLC PDUs including both RLC Data PDUs and RLC Control PDUs to the peer RLC, and the UE can report to a $1^{st}$ BS about the RLC retransmission error, without initiating RRC Connection Re-establishment procedure. This invention can be also applied a general wireless communication system, as well as above mentioned scenario, dual connectivity system.

Desirably, the first BS may be an MeNB in a MCG and the second BS may be a SeNB in a SCG, and vice versa.

More specifically, the $1^{st}$ BS is a BS that has a RRC connection with the UE, and controls mobility of the UE (S1401). The $2^{nd}$ BS is a BS that provides radio resource for the data transmission to/from the UE. The $2^{nd}$ BS may not have a RRC connection with the UE, but it is not limited thereto (S1403).

The UE can detect an RLC retransmission failure in a radio bearer (RB) during the data transmission to/from the $2^{nd}$ BS (S1405).

Desirably, the UE may determine the RLC retransmission failure when the number of retransmission of RLC PDU reaches a predetermined maximum number in the RB served by the $2^{nd}$ BS, but it is not limited thereto.

Desirably, the RLC PDU includes at least one AMD PDU or AMD PDU segment.

Desirably, the RB served by a $2^{nd}$ BS may be a RB that has RLC connection between UE and $2^{nd}$ BS. That is, the RLC peers of the RB are located in UE and $2^{nd}$ BS, but it is not limited thereto.

When the RLC retransmission error occurs in a RB having an RLC entity transmitting RLC PDU to the $2^{nd}$ BS, the UE can report a RLC retransmission error to the $1^{st}$ BS (S1407). At this time, the step of S1401 can be maintained. That means, the UE may report a RLC retransmission error without RRC connection re-establishment for the $1^{st}$ BS, but it is not limited thereto. The UE can report a RLC retransmission error to the $2^{nd}$ BS also.

In the step of S1407, the UE reports the $1^{st}$ BS about the RLC retransmission error, the UE can reports at least one of the following;

the identity of the RB having RLC retransmission error, the identities of all RBs served by the $2^{nd}$ BS having RLC retransmission error, the identity of the $2^{nd}$ BS having RLC retransmission error, and cause of the report (i.e. indicating the RLC retransmission error).

Furthermore, the UE may stop transmission of any further RLC PDUs including both RLC Data PDUs and RLC Control PDUs or reception of any further RLC PDUs including both RLC Data PDUs and RLC Control PDUs (S1409) during the step of S1407. In that case, the UE may stop either transmission or reception of all RBs that have RLC connection with the $2^{nd}$ BS or transmission or reception of an RB comprising the RLC entity, if the RLC retransmission error occurs in the RLC entity transmitting RLC PDU to the $2^{nd}$ BS. During the step of S1409, the UE may stop transmission of any further RLC PDUs including both RLC Data PDUs and RLC Control PDUs meanwhile maintain reception of any further RLC PDUs including both RLC Data PDUs and RLC Control PDUs. On the other hand, the UE may stop reception of any further RLC PDUs including both RLC Data PDUs and RLC Control PDUs meanwhile maintain transmission of any further RLC PDUs including both RLC Data PDUs and RLC Control PDUs. Moreover, the UE may stop both of transmission and reception of any further RLC PDUs including both RLC Data PDUs and RLC Control PDUs.

And the UE can release RB having RLC retransmission error during the step of S1409.

In conclusion, when the RLC stops transmission of any further RLC PDUs, it can perform at least one of the following actions additionally;

stopping reception of further RLC PDUs from the peer RLC, indicating to RRC that RLC retransmission error occurs—
This indication is different from that in prior art in that this indication does not trigger RRC Connection Re-establishment procedure, stopping transmission of all RBs that have RLC connection with the $2^{nd}$ BS having RLC retransmission error, stopping reception of all RBs that have RLC connection with the $2^{nd}$ BS having RLC retransmission error, release of the RB having RLC retransmission error, and release of all RBs that have RLC connection with the $2^{nd}$ BS having RLC retransmission error.

Figure 15:
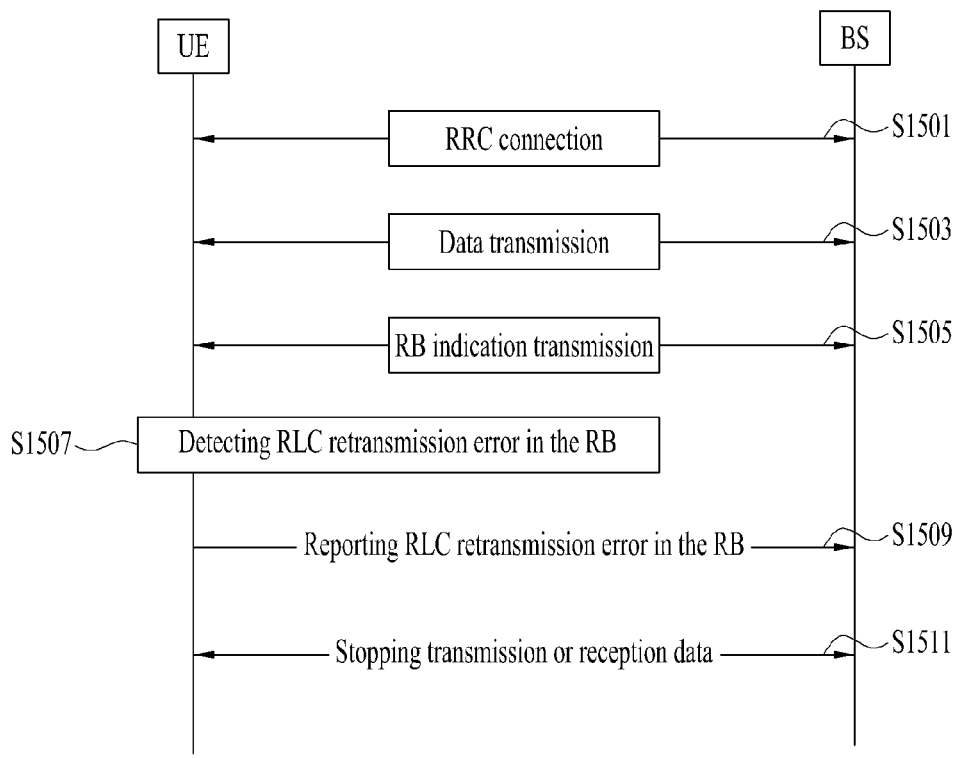
Figure 16:
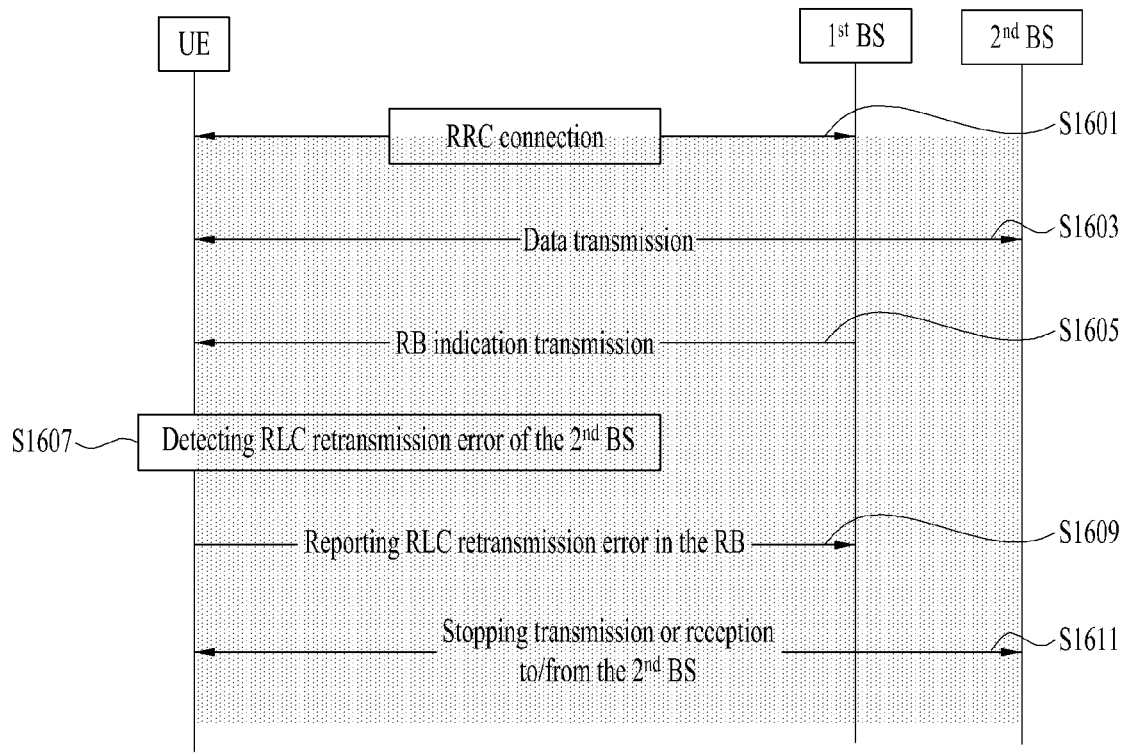

FIGS. 15 and 16 are diagrams for reporting a RLC retransmission error according to embodiments of the present invention.

This invention can be also applied to a general wireless communication system, as well as above mentioned scenario, dual connectivity system. FIG. 15 explains a diagram for reporting an RLC retransmission error in the general wireless communication system, and FIG. 16 explains a diagram for reporting an RLC retransmission error in the dual connectivity system.

Regarding FIG. 15, A BS has a RRC connection with the UE, and controls mobility of the UE (S1501) and also provides radio resource for the data transmission to/from the UE (S1503).

The invention can be applied to a specific RB that the BS indicates to the UE to report the error when RLC retransmission error occurs (S1505). More specifically, the BS may indicate to the UE at RB setup whether the RB needs to report RLC retransmission error when it occurs, but it is not limited thereto.

When the BS transmits an indicator indicating a RB which the UE reports a RLC retransmission error to the BS, desirably, the indicator can include an identity of the RB indicated by the indicator For example, the indicator can indicates as RBID=XX or reportRLCerror=TRUE/FALSE, but it is not limited thereto.

The UE can detect an RLC retransmission failure in the RB indicated by the BS during the data transmission (S1507).

Desirably, the UE may only detect an RLC retransmission failure in the RB indicated by the BS.

Desirably, the UE may determine the RLC retransmission failure when the number of retransmission of RLCPDU reaches a predetermined maximum number in the RB served by the BS, but it is not limited thereto.

Desirably, the RLC PDU includes at least one AMD PDU or AMD PDU segment.

When the RLC retransmission error occurs in the RB, the UE can report a RLC retransmission error to the BS (S1509). In the step of S1509, the UE reports the BS about the RLC retransmission error, the UE can reports at least one of the following;

the identity of the RB having RLC retransmission error, and cause of the report (i.e. indicating the RLC retransmission error).

Furthermore, the UE may stop transmission of any further RLC PDUs including both RLC Data PDUs and RLC Control PDUs or reception of any further RLC PDUs including both RLC Data PDUs and RLC Control PDUs (S1511) during the step of S1509. In that case, the UE may stop either transmission or reception of all RBs that have RLC connection with the BS or transmission or reception of an RB comprising the RLC entity when the RLC retransmission error occurs in the RB.

During the step of S1511, the UE may stop transmission of any further RLC PDUs including both RLC Data PDUs and RLC Control PDUs meanwhile maintain reception of any further RLC PDUs including both RLC Data PDUs and RLC Control PDUs. On the other hand, the UE may stop reception of any further RLC PDUs including both RLC Data PDUs and RLC Control PDUs meanwhile maintain transmission of any further RLC PDUs including both RLC Data PDUs and RLC Control PDUs. Moreover, the UE may stop both of transmission and reception of any further RLC PDUs including both RLC Data PDUs and RLC Control PDUs.

And the UE can release RB having RLC retransmission error during the step of S1511.

In conclusion, when the RLC stops transmission of any further RLC PDUs, it can perform at least one of the following actions additionally;

stopping reception of further RLC PDUs from the peer RLC, indicating to RRC that RLC retransmission error occurs—
This is indication is different from that in prior art in that this indication does not trigger RRC Connection Re-establishment procedure, stopping transmission of all RBs that have RLC connection with the BS having RLC retransmission error, stopping reception of all RBs that have RLC connection with the BS having RLC retransmission error, release of the RB having RLC retransmission error, and release of all RBs that have RLC connection with the BS having RLC retransmission error.

In case of the dual connectivity, regarding FIG. 16, the $1^{st}$ BS is a BS that has an RRC connection with the UE, and controls mobility of the UE (S1601). The $2^{nd}$ BS is a BS that provides radio resource for the data transmission to/from the UE. The $2^{nd}$ BS may not have a RRC connection with the UE, but it is not limited thereto (S1603).

The invention can be applied to a specific RB that the $1^{st}$ BS indicates to the UE to report the error when RLC retransmission error occurs (S1605). More specifically, the $1^{st}$ BS may indicate to the UE at RB setup whether the RB needs to report RLC retransmission error when it occurs, but it is not limited thereto.

Desirably, the RB served by a $2^{nd}$ BS may be a RB that has RLC connection between UE and $2^{nd}$ BS. That is, the RLC peers of the RB are located in UE and $2^{nd}$ BS, but it is not limited thereto.

When the 1st BS transmits an indicator indicating the RB which the UE reports a RLC retransmission error to the BS, the indicator can include an identity of the RB indicated by the indicator. For example, the indicator can indicates as RBID=XX, reportRLCerror=TRUE/FALSE, but it is not limited thereto.

The UE can detect an RLC retransmission failure in the RB indicated by the $1^{st}$ BS during the data transmission (S1607).

Desirably, the UE may only detect an RLC retransmission failure in the RB indicated by the $1^{st}$ BS, but it is not limited thereto.

Desirably, the UE may determine the RLC retransmission failure when the number of retransmission of RLC PDU reaches a predetermined maximum number in the RB served by the $2^{nd}$ BS, but it is not limited thereto.

Desirably, the RLC PDU includes at least one AMD PDU or AMD PDU segment.

When the RLC retransmission error occurs in the RB, the UE can report a RLC retransmission error to the $1^{st}$ BS (S1609). At this time, the step of S1401 can be maintained.

That means, the UE may report a RLC retransmission error without RRC connection re-establishment for the 1$^{st}$ BS, but it is not limited thereto.

In the step of S1609, the UE reports the BS about the RLC retransmission error, the UE can reports at least one of the following;

the identity of the RB having RLC retransmission error, and cause of the report (i.e. indicating to RLC retransmission error).

Furthermore, the UE may stop transmission any further RLC PDUs including both RLC Data PDUs and RLC Control PDUs or reception any further RLC PDUs including both RLC Data PDUs and RLC Control PDUs (S1611) during the step of S1609. In that case, the UE may stop either transmission or reception of all RBs that have RLC connection with the 2$^{nd}$ BS or transmission or reception of an RB comprising the RLC entity when the RLC retransmission error occurs in the RB.

During the step of S1611, the UE may stop transmission of any further RLC PDUs including both RLC Data PDUs and RLC Control PDUs meanwhile maintain reception of any further RLC PDUs including both RLC Data PDUs and RLC Control PDUs. On the other hand, the UE may stop reception of any further RLC PDUs including both RLC Data PDUs and RLC Control PDUs meanwhile maintain transmission of any further RLC PDUs including both RLC Data PDUs and RLC Control PDUs. Moreover, the UE may stop both of transmission and reception of any further RLC PDUs including both RLC Data PDUs and RLC Control PDUs.

And the UE can release RB having RLC retransmission error during the step of S1611.

In conclusion, when the RLC stops transmission of any further RLC PDUs, it can perform at least one of the following actions additionally;

stopping reception of further RLC PDUs from the peer RLC, indicating to RRC that RLC retransmission error occurs—
This indication is different from that in prior art in that this indication does not trigger RRC Connection Re-establishment procedure, stopping transmission of all RBs that have RLC connection with the 2$^{nd}$ BS having RLC retransmission error, stopping reception of all RBs that have RLC connection with the 2$^{nd}$ BS having RLC retransmission error, release of the RB having RLC retransmission error, and release of all RBs that have RLC connection with the 2$^{nd}$ BS having RLC retransmission error.

Figure 17:
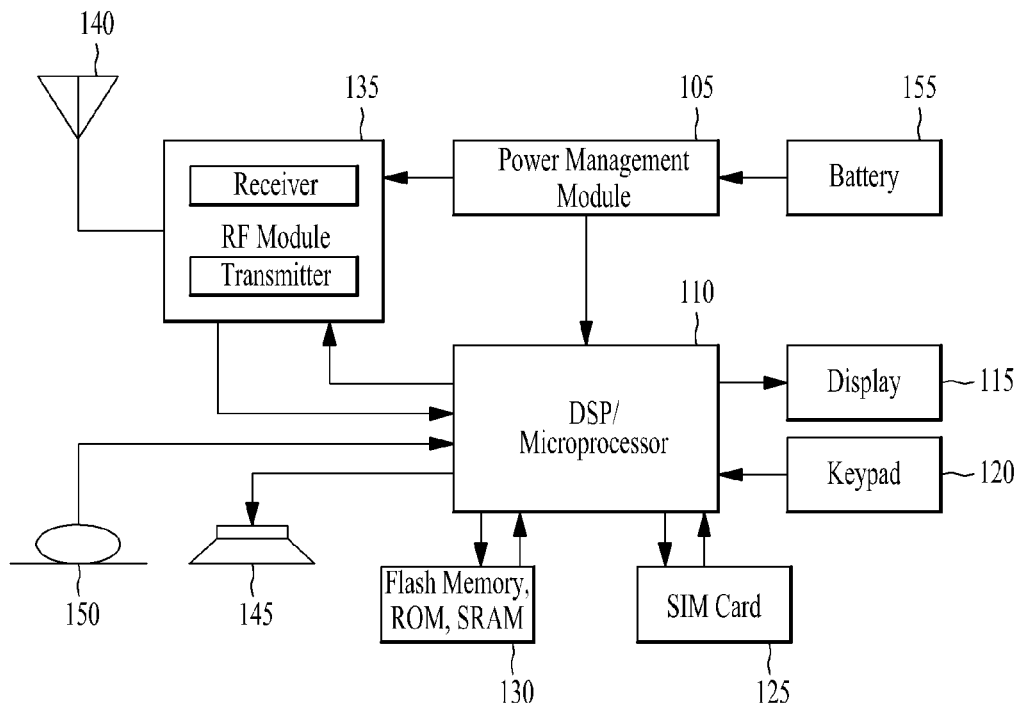
FIG. 17 is a block diagram of a communication apparatus according to an embodiment of the present invention.

FIG. 17 is a block diagram of a communication apparatus according to an embodiment of the present invention.

The apparatus shown in FIG. 17 can be a user equipment (UE) and/or eNB adapted to perform the above mechanism, but it can be any apparatus for performing the same operation.

As shown in FIG. 17, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 17 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 17 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for a user equipment (UE) operating in a wireless communication system comprising a first base station (BS) and a second BS, wherein the first BS has a radio resource control (RRC) connection with the UE, the method comprising:
   communicating with both the first BS and the second BS; and
   based on a radio link control (RLC) retransmission error occurring in a RLC entity transmitting a RLC protocol data unit (PDU) to the second BS:
      reporting, to the first BS, the RLC retransmission error without performing a RRC connection re-establishment procedure; and
      stopping transmission of all radio bearers (RBs) that have a RLC connection with the second BS through the RLC entity,
   wherein the all RBs includes a specific RB having a RLC connection with the second BS and a packet data convergence protocol (PDCP) connection with the first BS, and
   wherein a RLC peer entity to the RLC entity for the specific RB is in the second BS.

2. The method according to claim 1, wherein the first BS and the second BS are connected via a dual connectivity connection.

3. The method according to claim 1, wherein said reporting comprises reporting a cause of the informing of the RLC retransmission error.

4. The method according to claim 1, wherein the RLC retransmission error occurs in the RLC entity transmitting the RLC PDU to the second BS based on a number of the RLC PDU retransmissions reaching a predetermined maximum number in a RB served by the second BS.

5. The method according to claim 1, wherein said reporting comprises reporting an identity of a RB related to the RLC retransmission error.

6. The method according to claim 1, wherein the first BS and the second BS are connected via a non-ideal backhaul.

7. A user equipment (UE) in a wireless communication system comprising a first base station (BS) and a second BS, wherein the first BS has a radio resource control (RRC) connection with the UE, the UE comprising:
   a radio frequency (RF) module; and
   a processor configured to control the RF module,
   wherein the processor is configured to:
   communicate with both the first BS and the second BS; and
   based on a radio link control (RLC) retransmission error occurring in a RLC entity transmitting a RLC protocol data unit (PDU) to the second BS:
      report, to the first BS, the RLC retransmission error without performing a RRC connection re-establishment procedure; and
      stop transmission of all radio bearers (RBs) that have a RLC connection with the second BS through the RLC entity,
   wherein the all RBs includes a specific RB having a RLC connection with the second BS and a packet data convergence protocol (PDCP) connection with the first BS, and
   wherein a RLC peer entity to the RLC entity for the specific RB is in the second BS.

8. The UE according to claim 7, wherein the processor is further configured to report a cause of the informing of the RLC retransmission error.

9. The UE according to claim 7, wherein the RLC retransmission error occurs in the RLC entity transmitting the RLC PDU to the second BS based on a number of the RLC PDU retransmissions reaching a predetermined maximum number in a RB served by the second BS.

10. The UE according to claim 7, wherein the processor is further configured to report an identity of a RB related to the RLC retransmission error.

* * * * *